United States Patent
Lim et al.

(10) Patent No.: US 9,191,950 B2
(45) Date of Patent: Nov. 17, 2015

(54) METHOD AND APPARATUS FOR SCHEDULING WIRELESS PERSONAL AREA NETWORK

(75) Inventors: Jaewon Lim, Gyeonggi-do (KR); Suhwook Kim, Gyeonggi-do (KR); Bonghoe Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 14/005,313

(22) PCT Filed: May 25, 2012

(86) PCT No.: PCT/KR2012/004166
§ 371 (c)(1),
(2), (4) Date: Sep. 16, 2013

(87) PCT Pub. No.: WO2013/022176
PCT Pub. Date: Feb. 14, 2013

(65) Prior Publication Data
US 2014/0003401 A1    Jan. 2, 2014

Related U.S. Application Data

(60) Provisional application No. 61/522,686, filed on Aug. 11, 2011.

(51) Int. Cl.
*H04J 3/00* (2006.01)
*H04W 72/04* (2009.01)
*H04W 74/04* (2009.01)
*H04W 84/18* (2009.01)

(52) U.S. Cl.
CPC .......... *H04W 72/0446* (2013.01); *H04W 74/04* (2013.01); *H04W 84/18* (2013.01)

(58) Field of Classification Search
None
See application file for complete search history.

(56) References Cited

U.S. PATENT DOCUMENTS

| 5,726,983 A | 3/1998 | Bakke et al. |
| 6,665,307 B1 | 12/2003 | Rydnell et al. |
| 2005/0063372 A1* | 3/2005 | Jeong et al. .................. 370/376 |

(Continued)

FOREIGN PATENT DOCUMENTS

| JP | 10-093518 A | 4/1998 |
| KR | 10-2002-0038922 A | 5/2002 |

(Continued)

OTHER PUBLICATIONS

Written Opinion and International Search Report issued in corresponding International Patent Application No. PCT/KR2012/004166 dated Nov. 23, 2012.

*Primary Examiner* — Michael J Moore, Jr.
(74) *Attorney, Agent, or Firm* — Morgan, Lewis & Bockius LLP

(57) ABSTRACT

A method for a terminal receiving a guaranteed time slot (GTS) allocation in a wireless personal area network (WPAN), according to one embodiment in the present specification, comprises the steps of: deciding a GTS allocation interval based on characteristic information of the terminal; and transmitting a GTS request to a WPAN coordinator, wherein the GTS request comprises the GTS allocation interval which is decided by the terminal; and receiving the GTS allocation information from the WPAN coordinator, wherein the GTS allocation information comprises the GTS allocation interval which is decided by the WPAN coordinator based on the GTS request that is transmitted by the terminal.

12 Claims, 13 Drawing Sheets

(56) References Cited

U.S. PATENT DOCUMENTS

| | | | |
|---|---|---|---|
| 2007/0253345 A1* | 11/2007 | Habetha et al. | 370/254 |
| 2009/0154437 A1* | 6/2009 | Kim et al. | 370/338 |
| 2009/0304021 A1 | 12/2009 | Kraemer et al. | |
| 2010/0177748 A1* | 7/2010 | Erlmann et al. | 370/336 |
| 2011/0038343 A1* | 2/2011 | Bhatti et al. | 370/330 |
| 2011/0158206 A1* | 6/2011 | Shrestha et al. | 370/336 |
| 2012/0250664 A1* | 10/2012 | Li | 370/338 |
| 2014/0086204 A1* | 3/2014 | Lim | 370/330 |

FOREIGN PATENT DOCUMENTS

| | | |
|---|---|---|
| KR | 10-0569192 B1 | 4/2006 |
| KR | 10-0807529 B1 | 2/2008 |
| KR | 10-2008-0093998 A | 10/2008 |
| KR | 10-2009-0112942 A | 10/2009 |

* cited by examiner

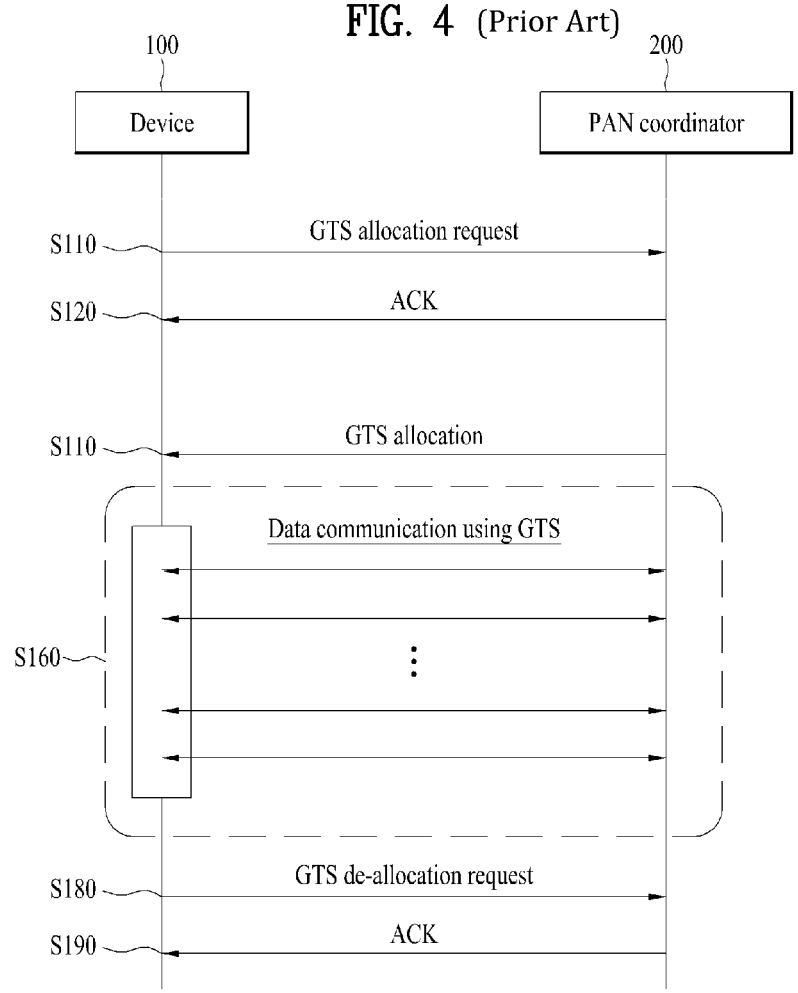

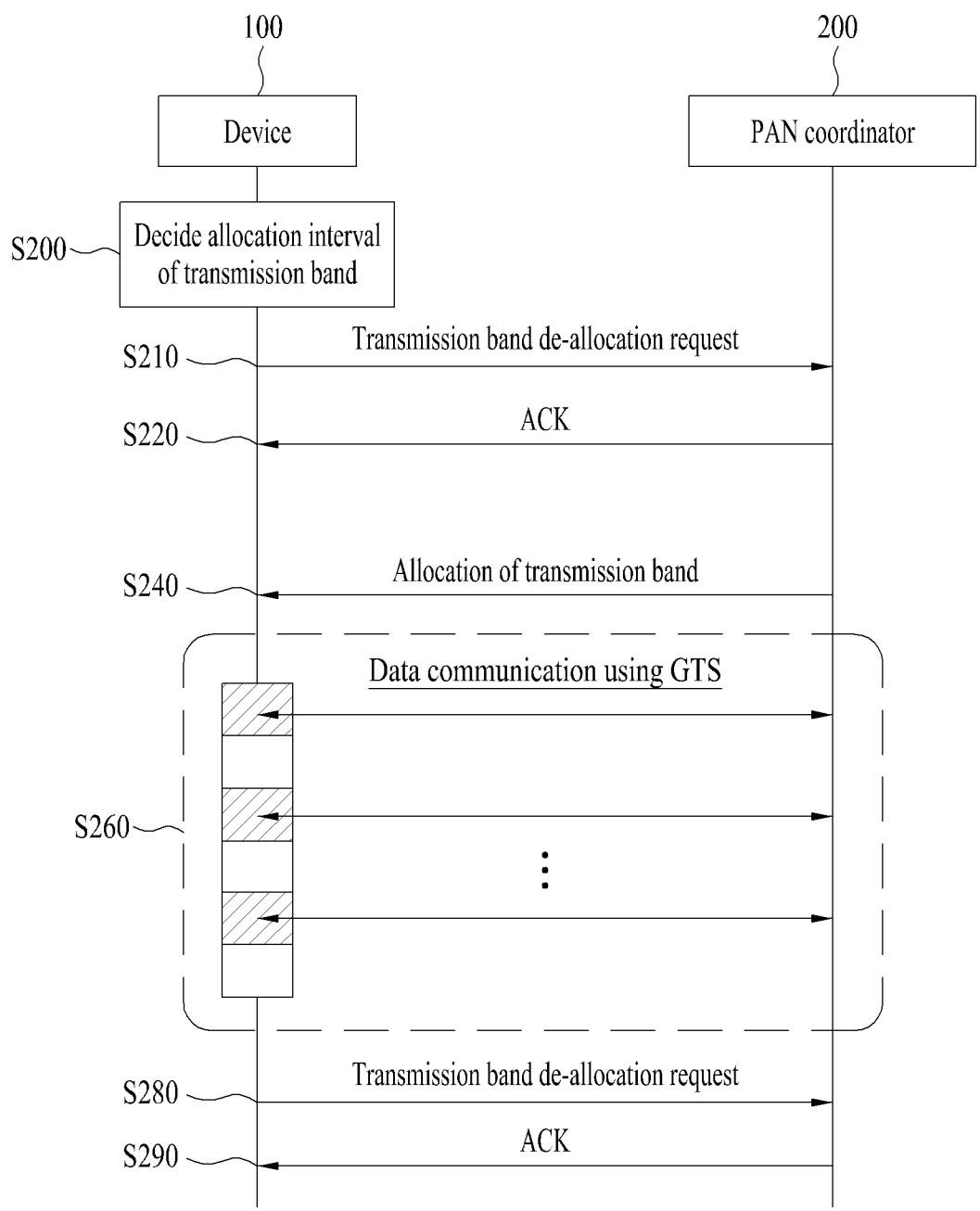

METHOD AND APPARATUS FOR SCHEDULING WIRELESS PERSONAL AREA NETWORK

FIELD OF THE INVENTION

The present invention relates to a method and apparatus for scheduling a wireless personal area network (hereinafter referred to as WPAN) and, more particularly, to a persistent scheduling method using a GTS (Guaranteed Time Slot)

BACKGROUND ART

Personal mobile devices may establish low-rate wireless personal area networks (hereinafter referred to as LR-WPAN), so as to perform communication.

An example of the LR-WPAN may include a network following the IEEE 802.15.4 standard. The IEEE 802.15.4 standard uses BPSK (binary phase-shift keying) in a 868/915 MHz band, so as to provide a transmission rate of 20 Kbps and 40 Kbps, and the IEEE 802.15.4 standard uses O-QPSK (offset quadrature phase-shift keying) in a 2.45 GHz band, so as to provide a transmission rate of 250 Kbps. The IEEE 802.15.4b standard may also use O-QPSK in a 868/915 MHz band, so as to provide a transmission rate of 250 Kbps

DETAILED DESCRIPTION OF THE INVENTION

Technical Objects

In the GTS allocation method of the conventional IEEE 802.15.4 system, when a device is allocated with the GTS, the corresponding device is continuously allocated with the GTS for each superframe until the GTS is de-allocated in accordance with a request of the device or due to a GTS expiration.

However, the above-described method is inefficient in that the required GTS may differ in each device. This is because, once a device is allocated with GTS, other devices cannot use the corresponding GTS until the de-allocation of the corresponding GTS.

Therefore, the present invention proposes a method for allocating GTS for each periodic superframe interval instead of allocating GTS for each superframe, among the superframes used in the WPAN system.

Technical Solutions

In order to resolve the above-described technical object, which is disclosed in the present description according to an exemplary embodiment of the present invention, a method of receiving a GTS (guaranteed time slot) allocation by a device in a WPAN (Wireless Personal Area Network) system includes the steps of deciding a GTS allocation interval based upon characteristics information of the device; transmitting a GTS request to a WPAN coordinator, wherein the GTS request includes a GTS allocation interval decided by the device; and receiving GTS allocation information from the WPAN coordinator, wherein the GTS allocation information includes a GTS allocation interval decided by the WPAN coordinator based upon the GTS request transmitted by the device.

According to an exemplary embodiment of the present invention, the GTS request may include a GTS interval field having a length of 2 bits, and wherein the GTS interval field indicates the GTS allocation interval decided by the device.

Also, according to an exemplary embodiment of the present invention, the receiving of the GTS allocation information may include receiving the GTS allocation information via a beacon frame. Also, according to an exemplary embodiment of the present invention, the beacon frame may include a Start Sequence Number field having a length of 6 bits and a GTS interval field having a length of 2 bits, wherein the Start Sequence Number field may indicate a sequence number of a superframe from which GTS allocation to the device starts, and wherein the GTS interval field may indicate the GTS allocation interval decided by the WPAN coordinator.

Also, according to an exemplary embodiment of the present invention, the receiving of the GTS allocation information may include receiving the GTS allocation information via a GTS confirmation command. Also, according to an exemplary embodiment of the present invention, the GTS confirmation command may include a Start Sequence Number field and a GTS interval field, wherein the Start Sequence Number field may indicate a sequence number of a superframe from which GTS allocation to the device starts, and wherein the GTS interval field may indicate the GTS allocation interval decided by the WPAN coordinator. Additionally, according to an exemplary embodiment of the present invention, after the receiving of the GTS allocation information, the device may operate in a sleep mode up to a superframe including a GTS decided by the WPAN coordinator.

Meanwhile, in order to resolve the above-described technical object, which is disclosed in the present description according to an exemplary embodiment of the present invention, a device of a WPAN (Wireless Personal Area Network) system includes a radio frequency unit configured to transmit and receive signals; and a controller connected to the radio frequency unit, wherein the controller is configured to decide a GTS allocation interval based upon characteristics information of the device, control the radio frequency unit to transmit a GTS request to a WPAN coordinator, wherein the GTS request includes a GTS allocation interval decided by the device, and control the radio frequency unit to receive GTS allocation information from the WPAN coordinator, wherein the GTS allocation information includes a GTS allocation interval decided by the WPAN coordinator based upon the GTS request transmitted by the device.

Also, according to an exemplary embodiment of the present invention, the GTS request may include a GTS interval field having a length of 2 bits, and wherein the GTS interval field may indicate the GTS allocation interval decided by the device.

Also, according to an exemplary embodiment of the present invention, the controller is configured to control the radio frequency unit to receive the GTS allocation information via a beacon frame. Additionally, according to an exemplary embodiment of the present invention, the beacon frame may include a Start Sequence Number field having a length of 6 bits and a GTS interval field having a length of 2 bits, wherein the Start Sequence Number field may indicate a sequence number of a superframe from which GTS allocation to the device starts, and wherein the GTS interval field may indicate the GTS allocation interval decided by the WPAN coordinator.

Also, according to an exemplary embodiment of the present invention, the controller is configured to control the radio frequency unit to receive the GTS allocation information via a GTS confirmation command. Additionally, according to an exemplary embodiment of the present invention, the GTS confirmation command may include a Start Sequence Number field and a GTS interval field, wherein the Start Sequence Number field may indicate a sequence number of a superframe from which GTS allocation to the device starts, and wherein the GTS interval field may indicate the GTS allocation interval decided by the WPAN coordinator.

Also, according to an exemplary embodiment of the present invention, after the receiving of the GTS allocation information, the controller is configured to operate in a sleep mode up to a superframe including a GTS decided by the WPAN coordinator.

Effects of the Invention

According to the GTS allocation method disclosed in the present description, a device participating in a WPAN decides the characteristics of the GTS in accordance with the type of data that are to be communicated, and requests for a GTS allocation from a coordinator of the WPAN. Additionally, this may also reduce power consumption of the device operating in the WPAN system.

BRIEF DESCRIPTION OF THE DRAWINGS

FIG. 4 illustrates a flow chart of GTS allocation and de-allocation (or recovery) procedures of the IEEE 802.15.4 system.

FIG. 7 illustrates a flow chart showing a method for allocating a transmission band according to a first exemplary embodiment of the present invention.

MODE FOR CARRYING OUT THE PRESENT INVENTION

Figure 1:
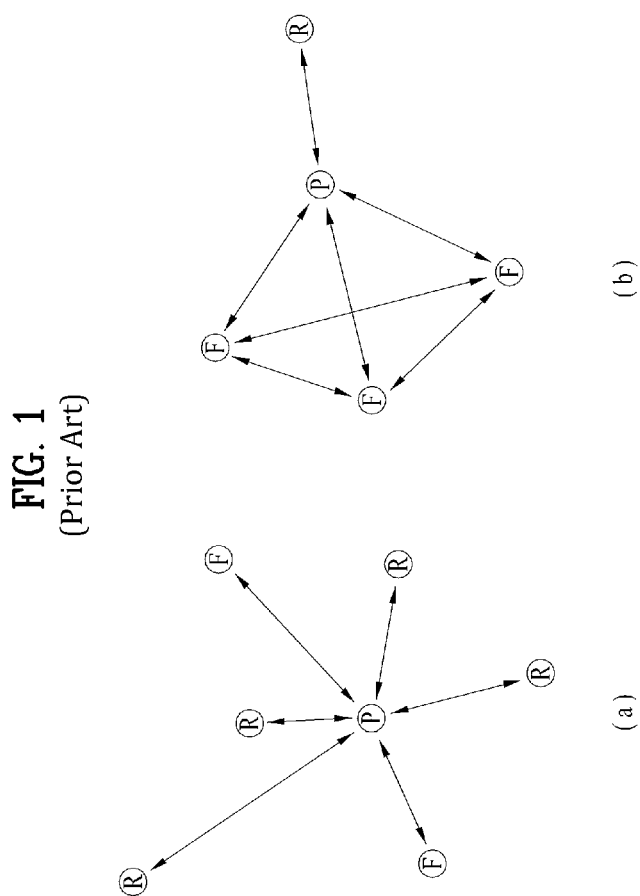
FIG. 1 illustrates an exemplary Network Topology according to an IEEE 802.15.4 standard.

The technical terms used in this specification are merely used to describe specific embodiments of the present invention. Therefore, it should be understood that the terms used herein are not intended to limit the present invention. Additionally, unless defined otherwise, the technical terms used in this specification should be interpreted by the meaning and significance generally known to and understood by anyone skilled in the art and, therefore, should not be interpreted as an excessively broad and inclusive meaning nor interpreted as an excessively narrow meaning. Moreover, in case any of the technical terms used in the specification of the present invention corresponds to an incorrect term that is incapable of correctly express the scope and spirit of the present invention, the corresponding term should be replaced by a correct technical term that can be correctly understood by anyone skilled in the art. Furthermore, the general terms used in the specification of the present invention should be understood by its literal meaning defined in a dictionary, or should be interpreted based upon the overall context of a phrase, sentence, or paragraph of the specification. And, therefore, such general terms should not be understood or interpreted by excessively narrow meanings.

Additionally, it is to be understood that, unless obviously and clearly noted or specified otherwise within the specification, singular forms of the terms used herein may include plural forms of the corresponding terms. In the application of the present invention, the terms "consist(s) of" or "include(s) (or comprise(s))" should not be interpreted or understood as including, without exception, all of the plurality of elements (or components) or the plurality of steps disclosed in the description of the present invention. In other words, it should be understood that some (or part) of the elements (or components) or some (or part) of the steps may not be included, or that additional elements (or components) or steps may be further included in the present invention.

Additionally, Additionally, the suffixes "module" and "unit" that are mentioned in the elements used in the present description are merely used individually or in combination for the purpose of simplifying the description of the present invention. Therefore, the suffix itself will not be used to have differentiate the significance or function or the corresponding term.

Furthermore, terms including numeric expressions, such as first ($1^{st}$), second ($2^{nd}$), and so on, used in the specification of the present invention may be used to described diverse elements of the present invention. However, the elements of the present invention should not be limited by the terms used in the specification of the present invention. In other words, such terms will be used only to differentiate one element from other elements of the present invention. For example, without deviating from the scope and spirit of the present invention, a first element may be referred to as a second element, and, similarly, a second element may also be referred to as a first element.

Hereinafter, the preferred embodiments of the present invention will be described in detail with reference to the accompanying drawings. However, regardless of the reference numerals within the drawings, the same reference numerals will be given to like or same part of the present invention, and detailed description of the same parts will be omitted for simplicity.

Also, in describing the present invention, if it is determined that detailed description of a disclosed technology may cause ambiguity in describing the principle of the present invention, the detailed description of the same will also be omitted for simplicity. Furthermore, it will be apparent that the appended drawings are merely provided to facilitate the understanding of the scope and spirit of the present invention, and that the appended drawings are not provided to limit the scope and spirit of the present invention. Therefore, it should be understood that the scope and spirit of the present invention can be extended to all variations, equivalents, and replacements in addition to the appended drawings of the present invention.

The examples disclosed in the description of the present invention may be supported and backed by standard documents for systems respective to IEEE 802.15.4, which correspond to the Low-Rate wireless PAN (personal area network), and, alternatively, the examples disclosed herein may also be supported and backed by disclosed standard documents respective to any one of the other systems for wireless access, such as the IEEE 802 system, the 3GPP system, the 3GPP LTE system, the LTE-A (LTE-Advanced) system, and the 3GPP2 system. More specifically, among the examples disclosed in the description of the present invention, process steps or elements (or parts) that have not been disclosed herein for clarity of the technical spirit of the present invention may be supported and backed by the above-described documents. Additionally, all of the terms disclosed in the description of the present invention may be described in accordance with the above-described standard documents.

Hereinafter, the exemplary embodiments of the description of the present invention will be described based upon the IEEE 802.15.4 standard, for clarity of the description. Nevertheless, the technical spirit of the present invention, which is disclosed in this description, will not be limited only to the description provided herein.

FIG. 1—WPAN Topology

FIG. 1 illustrates an exemplary Network Topology according to an IEEE 802.15.4 standard.

Two different types of devices, such as a Full Function Device (hereinafter referred to as FFD) and a Reduced Function Device (hereinafter referred to as RFD), may be involved (or be included or participate) in a network according to the IEEE 802.15.4 standard. Therefore, the topology of the network according to the IEEE 802.15.4 standard may be decided based upon the functions of the devices participating in the corresponding network. (a) of FIG. 1 shows an example of a star topology, and (b) of FIG. 1 shows an example of a peer-to-peer topology.

Since the FFD corresponds to a device that can perform all functions, e.g., the FFD may perform communication with an FFD or RFD, and the FFD may also other functions, such as network initialization, node management, node information storage, and so on. Most particularly, among the many FFDs, an FFD operating so that other devices can configure a network is referred to as a PAN coordinator device (Personal Area Network coordinator, hereinafter referred to as coordinator). Accordingly, the above-described network topology may be configured based upon the FFD, which performs the function of the coordinator.

However, the RFD performs a fewer number of functions as compared to the number of functions that can be performed by the FDD. Most particularly, counterpart devices that can communicate with the RFD are only limited to FFDs. Therefore, the RFD cannot perform the functions of the coordinator. By assigning all network functions to the FFD, the RFD may have a stack structure of a smaller size, thereby being capable of saving operation (or calculation)/memory resources. Most particularly, since the RFD can locate a coordinator and transmit data thereto and then immediately disconnect itself so as to enter a Sleep mode, the amount of consumed power may be very small, and, therefore, the RFD may be operated for a long period of time with the power of its battery.

Referring to FIG. 1, a device being indicated as "F" represents the FFD, a device being indicated as "R" represents the RFD, and a device being indicated as "P" represents an FFD performing the roles of a coordinator.

In the star topology shown in (a) of FIG. 1, only the communication between the device and the coordinator may be established. At this point, the devices may correspond to a starting point or an ending point of the communication, whereas the coordinator may correspond to a starting point, an ending point, or a router.

In the peer-to-peer topology shown in (b) of FIG. 1, each device may perform communication with any one of the devices existing in the network. Therefore, a network having a more complicated structure, such as a mesh network, may be configured.

The star network may operate the devices so that the durability of the battery may be maintained for a long period of time, and, since the Peer to Peer network may configure at least one or more data delivery paths, the Peer to Peer network may have higher data reliability and higher access recognition rate.

Figure 2:
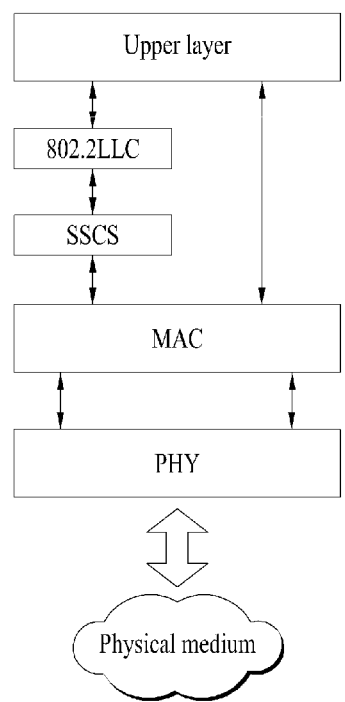
FIG. 2 illustrates a structural view of an IEEE 802.15.4 standard protocol stack corresponding to an example of an LR-WPAN system.

FIG. 2—802.15.4 Protocol Stack

FIG. 2 illustrates a structural view of an IEEE 802.15.4 standard protocol stack corresponding to an example of an LR-WPAN system.

As it can be known with reference to FIG. 2, the protocol stack may consist of a PHY layer (Physical layer), a MAC layer (Medium Access Control layer), and an Upper layer.

The PHY layer includes an RF transceiver (or transmitter/receiver) and a related control mechanism. The PHY layer may provide a PHY data service communicating (or transmitting/receiving) PHY PDUs (Protocol Data Units) via a physical channel and a PHY management service for managing the PHY layer.

The MAC layer provides access to a physical channel for data transmission. The MAC layer may provide a MAC data service communicating (or transmitting/receiving) MAC PDUs (Protocol Data Units) via a physical channel and a MAC management service for performing MAC layer management. The MAC layer may perform functions, such as beacon management, channel access, GTS management, frame verification, security functions, and so on.

The Upper Layer is configured of a Network Layer and an Application Layer. The network layer provides functions, such as network configuration, processing, message routing, and so on. The application layer provides the functions targeted by the device. For example, depending upon the type of the program installed therein. i.e., depending upon the type of the program processing the data of the application layer, an IEEE 802.15.4 device (100) may perform as an RFD (Reduced Function Device), an FFD (Full Function Device), or a coordinator.

FIG. 3—GAP & CFP

Figure 3A:
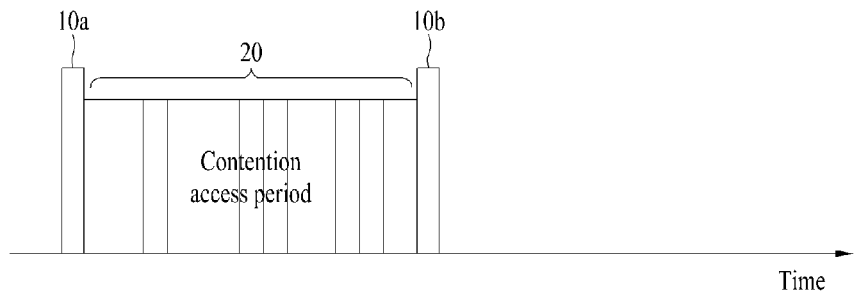
FIG. 3a to FIG. 3c illustrate exemplary structures of a super frame belonging to an IEEE 802.15.4 system corresponding to an example of the LR-WPAN system.
Figure 3B:
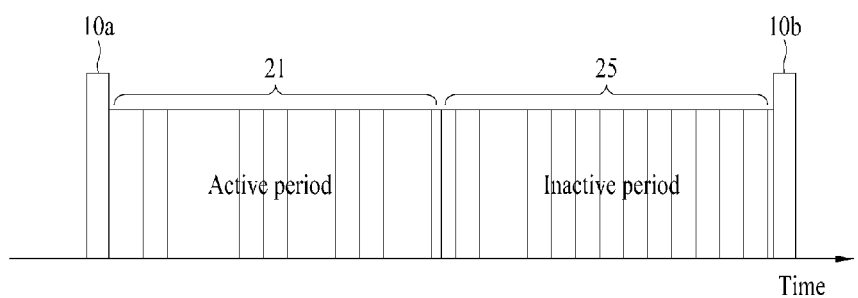
Figure 3C:
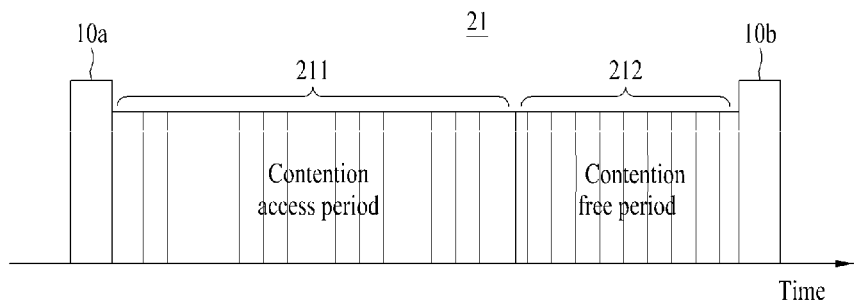

FIG. 3a to FIG. 3c illustrate exemplary structures of a super frame belonging to an IEEE 802.15.4 system corresponding to an example of the LR-WPAN system.

The super frame structure (or configuration) that is used in the LR-WPAN system may be decided by the coordinator. The coordinator may transmit the super frame, which is configured so that a beacon frame can be positioned in the first slot. In case the coordinator does not intend (or seek) to use the super frame structure, the coordinator may not perform the beacon transmission.

Meanwhile, devices that intend (or seek) to transmit data waits for the beacon frame, which is transmitted by the coordinator, and, when the beacon frame is received, the devices perform synchronization on the super frame structure. The beacon frame synchronizes the devices that take part (or participate) in the PAN, which is established by the coordinator, identifies the PAN, and uses the identified PAN to indicate (or show) the structure of the super frame.

Hereinafter, the structure of a super frame that maybe used in order to transmit/receive to and from the devices will be described in detail with reference to FIG. 3.

The devices within the LR-WPAN system competitively perform media access in order to be capable of transmitting/receiving data by using the super frame. However, in case the coordinator, which participates in the WPAN, allocates a time slot to specific devices by using the super frame, the devices that are assigned with the time slot may be capable of communicating (or transmitting/receiving) data without having to compete (or be in contention) with other devices. More specifically, in accordance with the structure of the super frame, which is decided by the coordinator, the devices participating in the WPAN may perform contention-based or non-contention based media access for data communication (or transmission/reception).

FIG. 3a illustrates the structure of a super frame indicating a contention-based access period. Referring to FIG. 3a, the super frame included in the LR-WPAN system is configured to have a structure of multiple time slots (20) (e.g., 16 time slots) for communicating (or transmitting/receiving) data being included in-between beacon frames (10a to 10b, and so on), which are transmitted by the coordinator. When such super frame having the above-described structure is used, the devices participating in the WPAN may use the time slots included in the super frame, so as to transmit data frames to the coordinator based upon a CSMA-CA (Carrier Sense Multiple Access/Collision Avoidance) method.

FIG. 3b illustrates the structure of a super frame including an active period and an inactive period. Referring to FIG. 3b, the super frame included in the LR-WPAN system is configured to have a structure of an active period (or section) (21) and an inactive period (or section) (25) being included in-between beacon frames (10a to 10b, and so on).

The active period (21) corresponds to a period (or section) performing data communication (or transmission/reception) in-between (or to/from) devices, and, therefore, the active period (21) is configured of time slots designated to frames that are used for communicating (or transmitting/receiving) data. On the other hand, the inactive period (25) refers to a section wherein data communication (or transmission/reception) in-between (or to/from) the devices is not performed.

During the inactive period (25), the coordinator may enter a low-power mode.

A ratio between the active period (21) and the inactive period (25) may be referred to as a duty cycle, and the value of the duty cycle may be adjusted based upon requirements for the low-power operation of the LR-WPAN system and also based upon requirements for the co-existence of communication methods using the same physical transmission (or transport) channel.

FIG. 3c illustrates the structure of an active period. Referring to FIG. 3c, the active period (21), which is used for communicating (or transmitting/receiving) data, may be configured to include a Contention Access Period (hereinafter referred to as CAP) (211) and a Contention Free Period (hereinafter referred to as CFP) (or non-contention period) (212).

The CAP (211) is configured of time slots enabling devices participating in the WPAN to perform contention-based transmission of data frames. Therefore, in case of a device that intends to perform communication by using time slots belonging to the CAP (211), which is located between the two beacon frames (10a and 10b), the corresponding device is in a contention-based relation with another device by using the CSMA-CA method.

The CFP (212) is configured of GTSs (Guaranteed Time Slots), which correspond to time slots being allocated (or assigned) to allow a specific device to transmit data frames. The GTS may be used for a low-latency application program (or application program having a fast response speed) or for an application program requiring a specific transmission bandwidth within the device.

For example, in the IEEE 802.15.4 standard corresponding to the example of the LR-WPAN, the CFP (212) is located after the CAP (211) within the super frame, and the CFP (212) may be configured to include up to a maximum limit of 7 GTSs. Additionally, the CFP (212) may also be configured to have multiple GTS to be assigned (or allocated) to a single device.

The coordinator decides to which device each GTS within the CFP (212) is to be allocated (or assigned). The GTS allocation information of the CFP (212), which is decided by the coordinator, may be transmitted while being included in a beacon frame (10a), which corresponds to the very first slot of the super frame.

FIG. 4—GTS Allocation/De-Allocation

FIG. 4 illustrates a flow chart of GTS allocation and de-allocation (or recovery) procedures of the IEEE 802.15.4 system.

In the WPAN system, a predetermined transmission bandwidth should be allocated (or assigned) in order to perform data communication (or transmission/reception) through an exclusive (or closed) band allocation (or assignment) between a specific device and the coordinator, and, in the IEEE 802.15.4, the GTS (guaranteed time slot) is defined as the transmission band. Hereinafter, a detailed description will be given based upon the allocation of the GTS.

In case a device (or terminal) (100) includes data that are to be transmitted to a WPAN coordinator (200), the device (100) requests for a GTS allocation (S110) by transmitting a GTS request command including a parameter for the required GTS to the WPAN coordinator (200). At this point, a Characteristics Type within a GTS Characteristics field, which is included in the GTS request command, is set to 1, so as to indicate that the transmitted command corresponds to a GTS allocation request.

After deciding the GTS allocation respective to the device (100), the WPAN coordinator (200), once the device (or terminal) (100) decides to allocate the GTS, the device (100) transmits an ACK (Acknowledgment) to the device (100) (S120). Thereafter, the WPAN coordinator (200) transmits a beacon including information on the allocated GTS (GTS descriptor) (S140), so as to allow the device (100) receiving the beacon to use the GTS in accordance with the respective information.

The device (100) uses the allocated GTS, so as to communicate (or transmit/receive) data to/from the WPAN coordinator (200) (S160).

When the GTS is no longer necessary, the device (100) transmits a GTS de-allocation request command (GTS request command) to the WPAN coordinator (200) (S180). At this point, a Characteristics Type within a GTS Characteristics field, which is included in the GTS de-allocation request command, is set to 0, so as to indicate that the transmitted command corresponds to a GTS de-allocation request. After receiving the GTS de-allocation request from the device (100), the WPAN coordinator (200) de-allocates (or recovers) the GTS that was allocated to the device (100) and transmits an ACK to the device (100) (S190).

Figure 5:
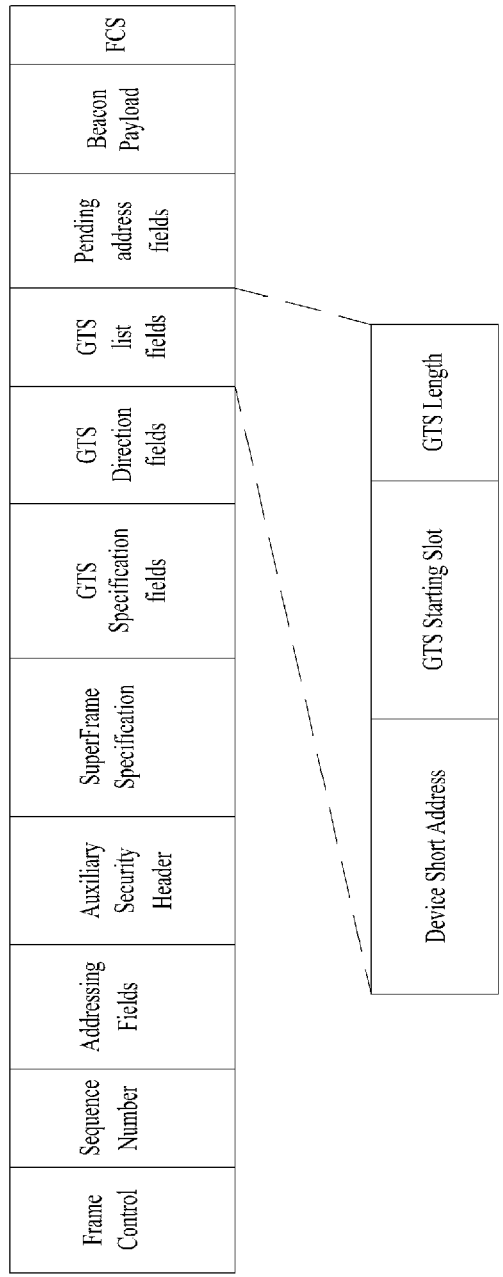
FIG. 5 illustrates structures of a beacon frame and a GTS descriptor, which are used in the IEEE 802.15.4 system.

FIG. 5—Beacon Frame Structure

FIG. 5 illustrates structures of a beacon frame and a GTS descriptor, which are used in the IEEE 802.15.4 system.

The content of each field included in the beacon frame follows the respective content defined in the IEEE 802.15.4. Most particularly, the allocation content respective to each GTS is configured by the WPAN coordinator to have a GTS descriptor format. The GTS descriptors are included in a GTS list of the beacon.

A Device Short Address sub field indicates a short address having the length of 16 bits respective to the device designated by the GTS descriptor. A GTS Start Slot sub field corresponds to a 4-bit field, which indicates the number of a slot from which the corresponding GTS starts. A GTS Length sub field corresponds to 4-bit field, which indicates the number of slots configuring the corresponding GTS.

Figure 6:
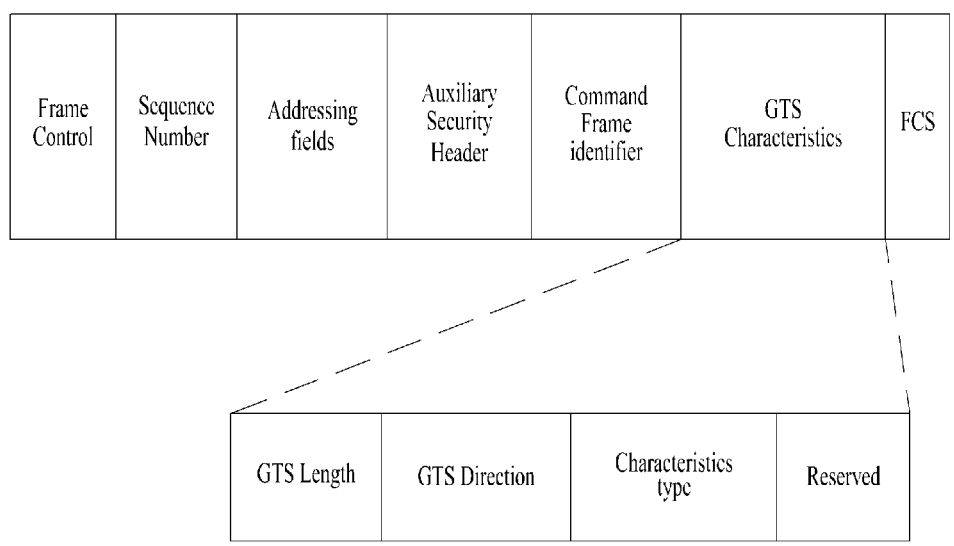
FIG. 6 illustrates structures of a GTS request command, which is used in the IEEE 802.15.4 system.

FIG. 6—GTS Request Command Frame

FIG. 6 illustrates structures of a GTS request command, which is used in the IEEE 802.15.4 system.

A GTS request command includes a GTS characteristics field, and the GTS request command delivers the nature (or attribute) and characteristics of the requested GTS to the WPAN coordinator.

The GTS Characteristics field includes GTS Length, GTS Direction, and Characteristics Type sub fields. The GTS Length sub field indicates a number of super frame slots with which the corresponding GTS should be configured. The GTS Direction sub field indicates whether the corresponding GTS is used by the device for a receiving purpose or for a transmitting purpose. The Characteristics Type sub field indicates whether the corresponding GTS request command is being used for GTS allocation or whether the corresponding GTS request command is being used for GTS de-allocation.

FIG. 7—GTS Allocation Procedure I

FIG. 7 illustrates a flow chart showing a method for allocating a transmission band according to a first exemplary embodiment of the present invention.

In case a device (100) has data that are to be transmitted to the WPAN coordinator (200), the device (100) may request for the allocation of a transmission band that is required for communicating (or transmitting/receiving) data. An example of the transmission band may correspond to a Guaranteed Time Slot (GTS).

In case of requesting for the allocation of a transmission band, the device (100) may decide the allocation interval (or period) of the transmission band based upon its own characteristics information (S200). The characteristics information may correspond to information that is acquired from the data that are to be transmitted or may correspond to information that is acquired from the characteristics of the device itself. For example, information on the total amount of the data that are to be transmitted, information on whether or not the data correspond to data that are to be periodically transmitted, information on the usage of the device, and so on may correspond to the characteristics information. When the device decides the allocation period (or interval) of the transmission band, the device may carry out the decision-making process in super frame units or in predetermined time units. More specifically, the device may decide the allocation period (or interval) by using methods, such as "1 transmission band per 3 super frames" or "1 transmission band per 20 ms", and so on, based upon the characteristics information.

Thereafter, the device (100) may transmit the transmission band request, which includes the allocation interval (or period) of the decided transmission band, to the WPAN coordinator (200) (S210). For example, in case of requesting for the allocation of the GTS, the device transmits a GTS request command to the WPAN coordinator (200).

The transmission band request may include a time (or super frame) of the GTS allocation, information on a required (or necessary) transmission band, allocation interval decided by the device, and so on. At this point, the transmission band request may correspond to a GTS request command defined in the IEEE 802.15.4. The allocation interval of the transmission band may be included in a GTS Characteristics field within the GTS request command. The GTS Characteristics field may further include a GTS interval (or period) field, and the GTS interval (or period) field may indicate an allocation period of the transmission band decided by the device (100).

After receiving the transmission band request from the device (100), the WPAN coordinator (200) transmits an ACK (Acknowledgement) so as to notify the device (100) of an authorization (or confirmation) of the transmission band allocation (S220). Alternatively, if there is no authorization (or confirmation) to be allocated to the device (100), the WPAN coordinator (200) may also transmit a notification indicating that a transmission band cannot be allocated. In case of allocating a transmission band to the device (100), the WPAN coordinator (200) may allocate the transmission band based upon the allocation interval of the transmission band, which is included in the received transmission band request. At this point, the allocation may be performed as requested by the device, or the allocation may be performed differently from what is requested by the device based upon resource situation, communication situation with other devices, and so on. For example, the device may have initially requested for "1 transmission band per 2 super frames", if the number of available transmission bands is insufficient, "1 transmission band per 4 super frames" may be allocated.

The WPAN coordinator (200) may transmit the allocation information of the transmission band to the device (S240). The allocation information of the transmission band may correspond to the allocation interval of the transmission band, which is decided by the WPAN coordinator (200), a starting point or ending point of the transmission band, and so on.

The WPAN coordinator (200) may transmit the allocation information to the device (100) via a beacon, which is defined in the IEEE 802.15.4, and the transmission band allocation information may be included in the GTS list field within the beacon. At this point, the GTS list field may further include a Start Sequence Number field and a GTS interval field. The Start Sequence Number field indicates a sequence number of a super frame from which the transmission band begins to be allocated to the device, and the GTS interval field indicates an interval of the transmission band, which is allocated to the device.

The device (100) may communicate (or transmit/receive) data to and from the WPAN coordinator (200) via the allocated transmission band (S260).

In case the communication (or transmission/reception) of the data is completed, the device may transmit a transmission band de-allocation request (S280). After receiving the de-allocation request, the coordinator transmits an ACK (S290) and may stop further allocation of the transmission band.

The transmission band request of step S210 may correspond to a request for allocating a transmission band transmitted from a CFP (contention free period). At this point, if the CFP is allocated with a transmission band, data may be communicated (or transmitted/received) by performing the above-described procedure. If the CFP fails to be allocated with the transmission band, the device transmits data from a CAP (Contention Access Period).

FIG. 8—GTS Request Command & Beacon Frame—1

Figure 8A:
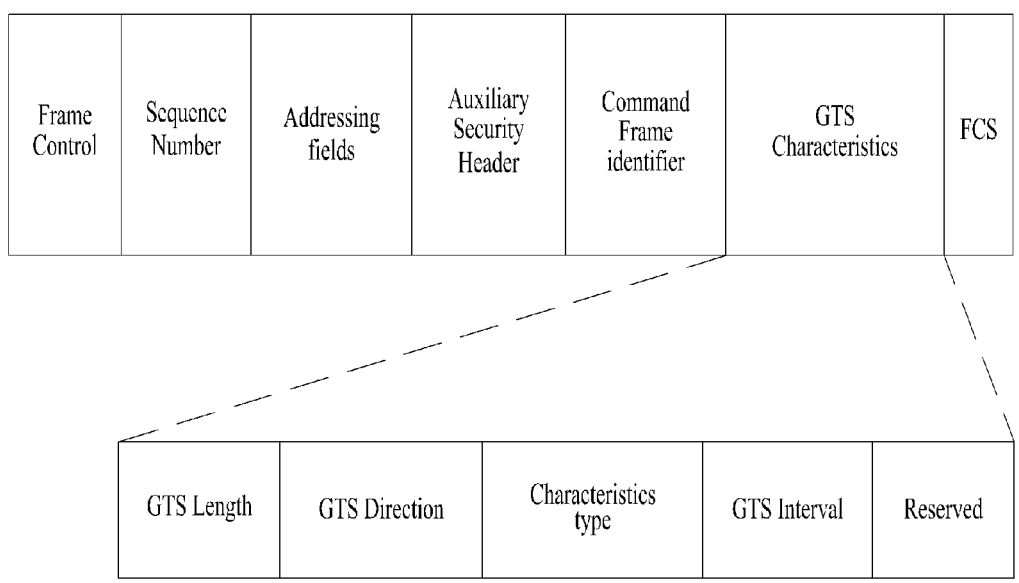
FIG. 8a and FIG. 8b illustrate structures of a GTS request command and a beacon frame according to the exemplary embodiment of the present invention.
Figure 8B:
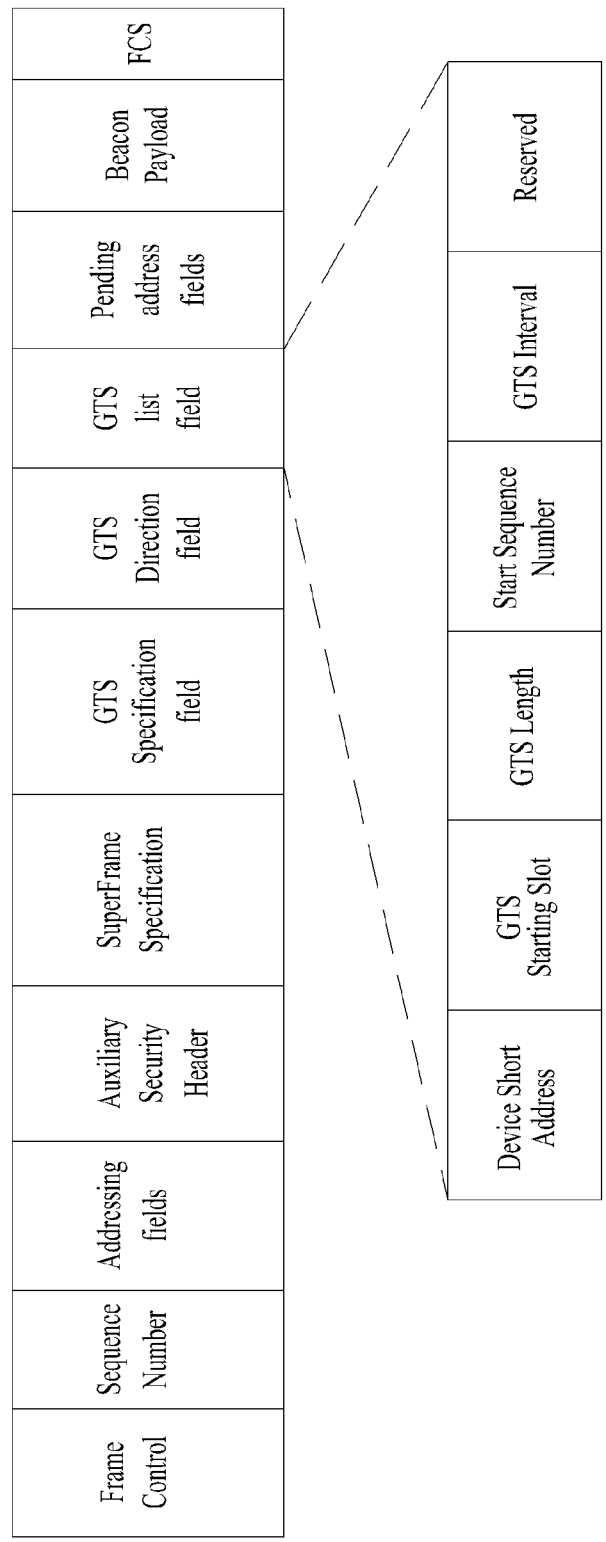

FIG. 8a and FIG. 8b illustrate structures of a GTS request command and a beacon frame according to the exemplary embodiment of the present invention.

First of all, FIG. 8a illustrates the structures of a GTS request command and a beacon frame.

The GTS request command may be used when the transmission band requested by the device to the WPAN coordinator corresponds to the GTS. As shown in FIG. 8a, the GTS request command according to the exemplary embodiment of the present invention further includes a GTS interval (or period) field in the GTS characteristics field, which is defined in the IEEE 802.15.4. The GTS interval field indicates the GTS allocation interval, which is decided by the device. The device may designate the GTS allocation interval in superframe units. For example, the GTS interval field value may be set up (or determined), so that the GTS allocation can be requested 1 time per 2 superframes.

Additionally, the device may also designate the GTS allocation interval in time units. For example, the GTS interval field value may be set up (or determined), so that the GTS allocation can be requested 1 time per 10 milliseconds (ms).

The device may decide the GTS interval field value based upon the superframe length of the WPAN, which the device is currently accessing.

Subsequently, FIG. 8b illustrates the structure of a beacon frame.

The beacon may be used for allowing the WPAN coordinator to transmit information related to the transmission band allocation to the device. As shown in FIG. 8b, the beacon frame according to the exemplary embodiment of the present invention further includes a "Start Sequence Number field and a "GTS interval (or period)" field in the GTS list field, which is defined in the IEEE 802.15.4. The Start Sequence Number field indicates a sequence number of a super frame from which the GTS begins to be allocated to the device, and the GTS interval field indicates an interval of the transmission band, which is allocated to the device. As the method for designating the allocation interval of the transmission band (e.g., GTS), which is allocated to the device, the beacon may use the same method as the method of indicating the GTS allocation interval in the GTS request command.

FIG. 9—GTS Request Command & Beacon Frame—2

Figure 9A:
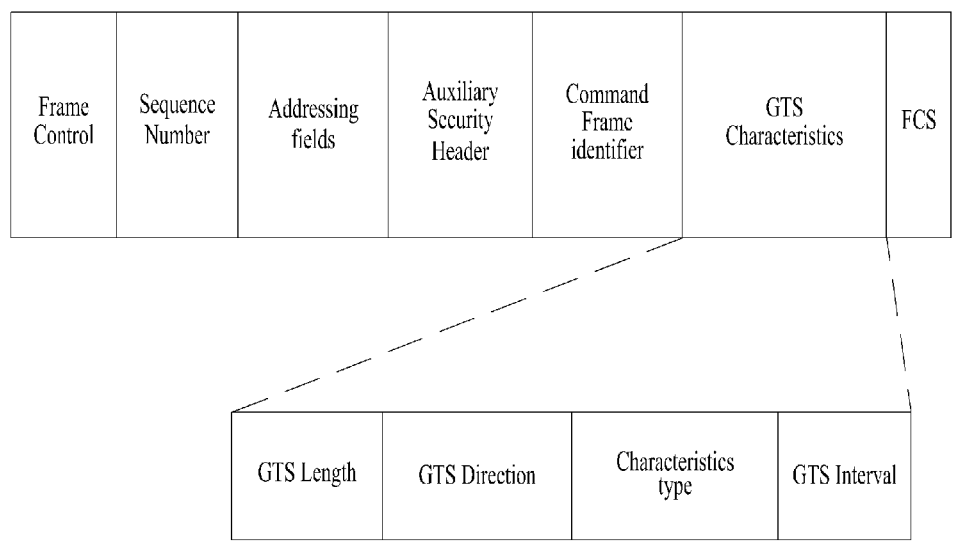
FIG. 9a and FIG. 9b illustrate other structures of a GTS request command and a beacon frame according to the exemplary embodiment of the present invention.
Figure 9B:
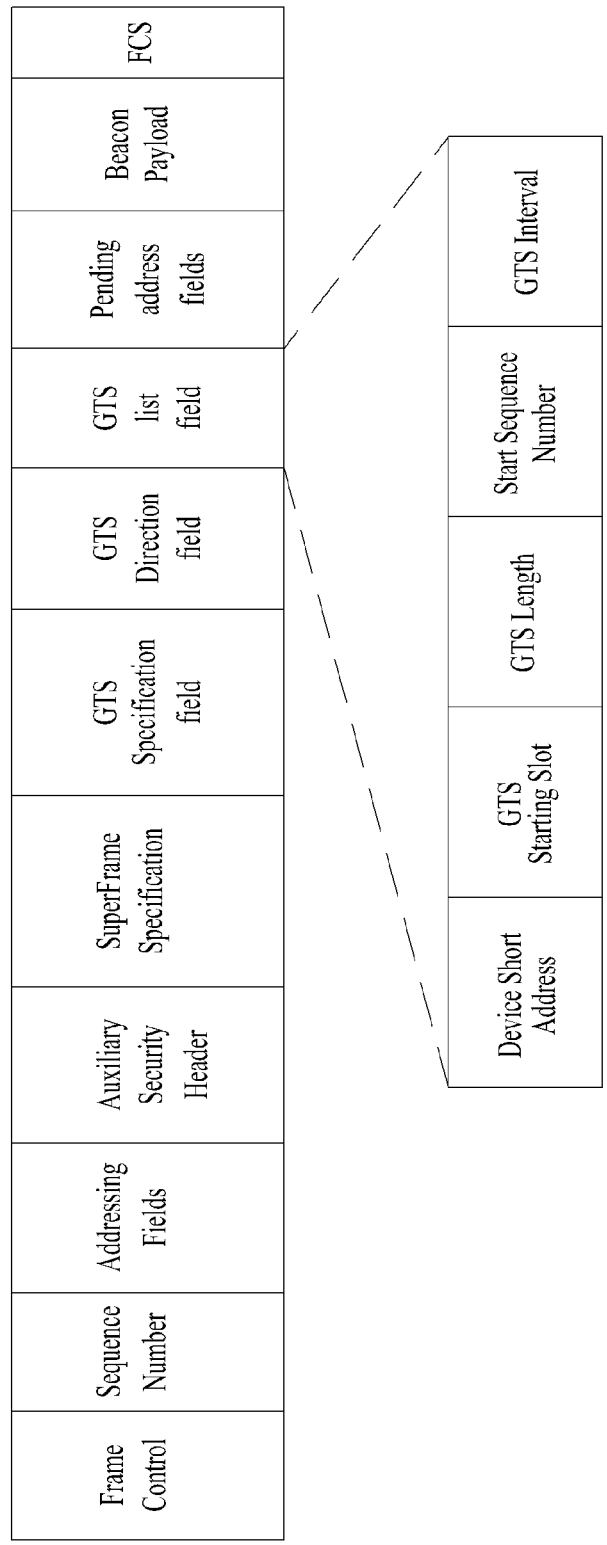

FIG. 9a and FIG. 9b illustrate other structures of a GTS request command and a beacon frame according to the exemplary embodiment of the present invention.

First of all, FIG. 9a illustrates the structures of a GTS request command and a beacon frame.

In case of FIG. 9a, in order to be configured to have the same bit size (or number of bits) as the GTS Characteristics field of the IEEE 802.15.4, the GTS interval field may be configured to have the size of 2 bits. In case it is difficult to indicate a longer interval by using only 2 bits, a predetermined constant may be used as supplement. The constant may be multiplied by the GTS interval field value, so as to indicate the GTS interval value that is actually to be used. More specifically, (the GTS interval value)×(constant) value becomes the GTS allocation interval. In the information related to the constant may be transmitted by the PAN coordinator to the device.

Subsequently, FIG. 9b illustrates the structure of a beacon frame.

In case of FIG. 9b, in order to reduce the overhead of the beacon frame, the GTS interval field may be configured to have the length of 2 bits, and the Start Sequence Number field may be configured to have the length of 6 bits. The GTS interval field indicates a GTS allocation interval, which is decided by the WPAN coordinator. The Start Sequence Number field indicates the sequence number of the superframe from which the GTS begins to be allocated to the device.

FIG. 10—GTS Allocation Procedure II

FIG. 10 illustrates a flow chart showing a method for allocating a transmission band according to a second exemplary embodiment of the present invention.

Figure 10A:
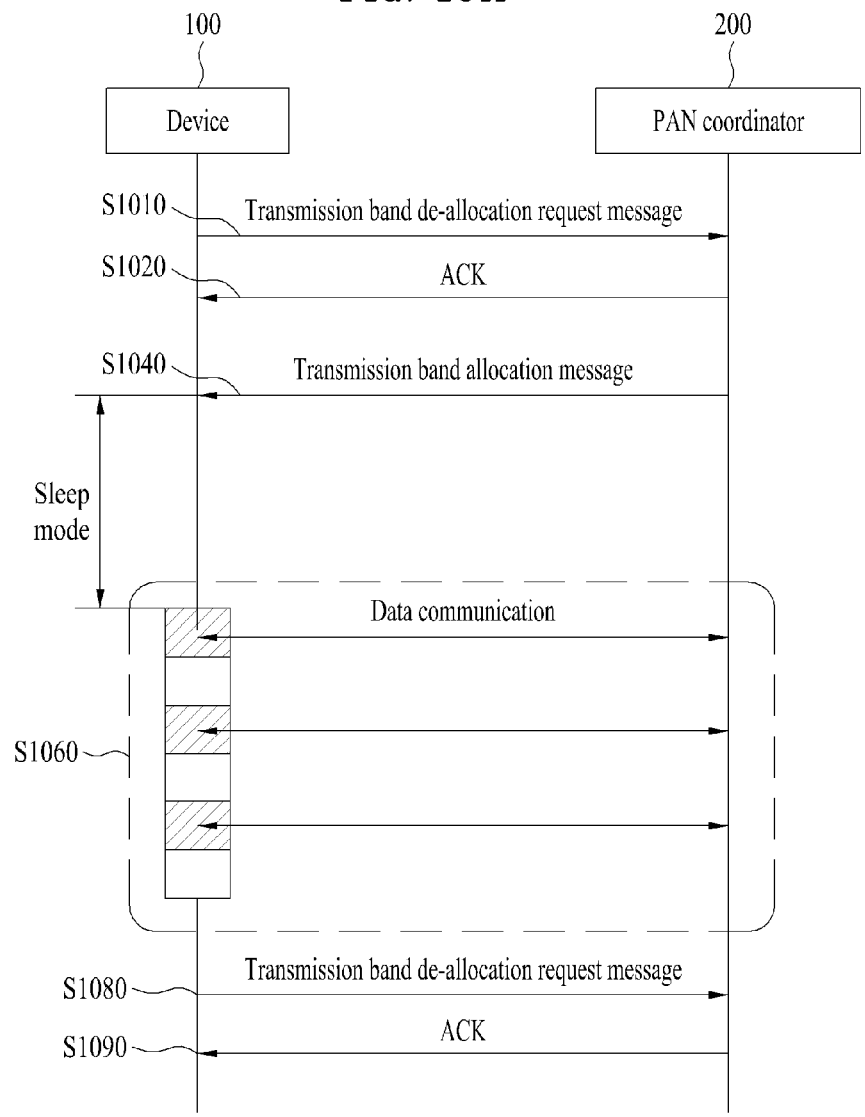
FIG. 10 illustrates a flow chart showing a method for allocating a transmission band according to a second exemplary embodiment of the present invention.

Step S1010 to step S1020 of FIG. 10a are identical to step S200 to step S220 of FIG. 7.

The WPAN coordinator (200) may transmit the allocation information of the transmission band to the device (S1040).

The allocation information of the transmission band may correspond to the allocation interval of the transmission band, which is decided by the WPAN coordinator (200), a starting point or ending point of the transmission band, and so on. At this point, the transmission band allocation information may be transmitted via a GTS confirmation command.

The GTS confirmation command may include a GTS Characteristics field, and the GTS confirmation command may further include a Start Sequence Number field and a GTS interval field. The Start Sequence Number field indicates a sequence number of a super frame from which the transmission band begins to be allocated to the device, and the GTS interval field indicates an interval of the transmission band, which is allocated to the device.

After receiving the GTS confirmation command, the device stops the communication up to the superframe, which is designated by the Start Sequence Number field included in the GTS confirmation command. And, then, the device may enter an inactive state or a sleep state, so as to minimize power consumption. This is more advantageous than the related art, and detailed description of the same will hereinafter be given with reference to FIG. 10b and FIG. 10c.

Subsequently, step S1060 to step S1090 are identical to step S260 to step S290 of FIG. 7.

Figure 10B:
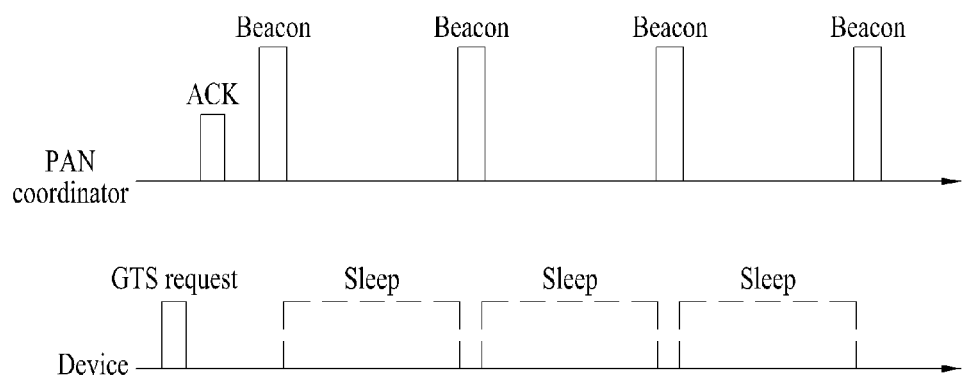

FIG. 10b illustrates a related art GTS allocation procedure. In order to confirm (or verify) the GTS allocation information, the device should consecutively receive the beacon frame up to a maximum of 4 times. In this case, since the device should shift from the sleep mode to the active mode in order to receive the beacon frame, a large amount of power is consumed.

Figure 10C:
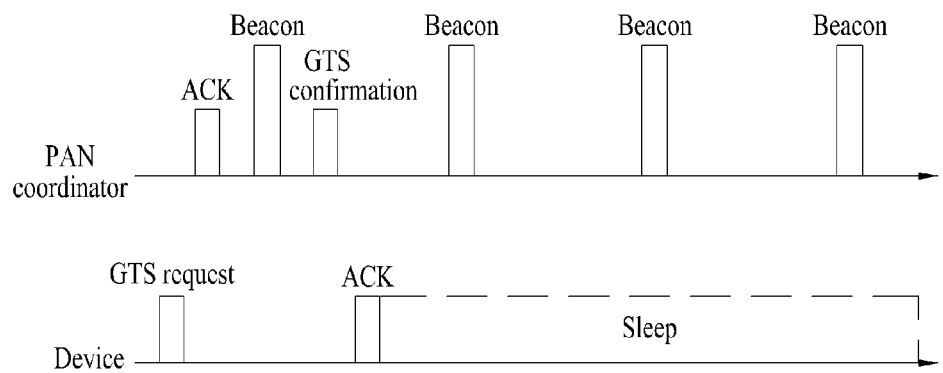

FIG. 10c illustrates a GTS allocation procedure according to the present description. After receiving the GTS confirmation command, the device may operate immediately (or immediately after transmitting an ACK) in the sleep mode. Therefore, the power consumption of the device may be minimized.

Figure 11:
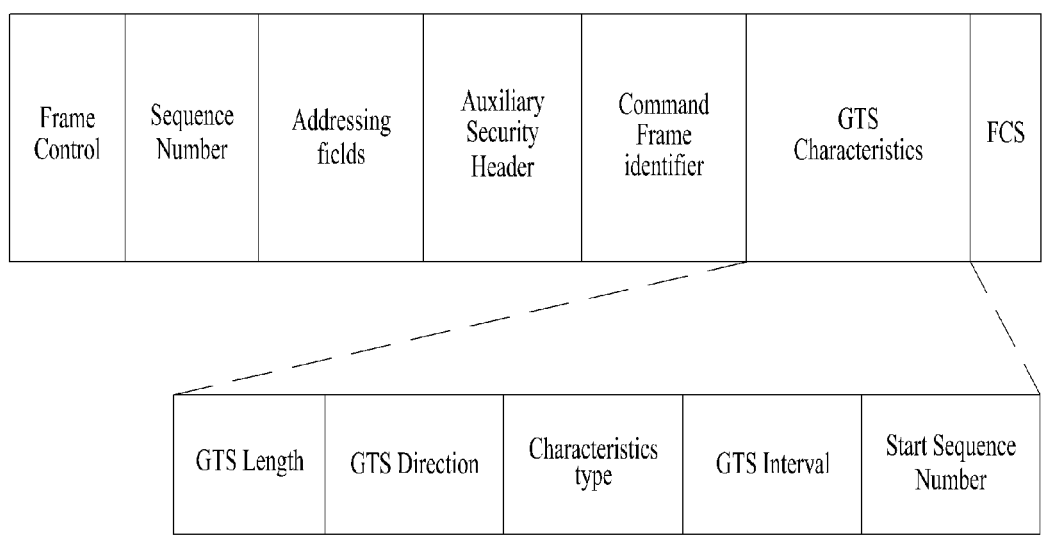
FIG. 11 illustrates a structure of a GTS confirmation command according to the exemplary embodiment of the present invention.

FIG. 11—GTS Request Command & Beacon Frame—3

FIG. 11 illustrates a structure of a GTS confirmation command according to the exemplary embodiment of the present invention.

The GTS confirmation command may include a GTS Characteristics field, and the GTS confirmation command may further include a Start Sequence Number field and a GTS interval field. The Start Sequence Number field indicates a sequence number of a super frame from which the transmission band starts to be allocated to the device, and the GTS interval field indicates an interval of the transmission band, which is allocated to the device.

FIG. 12—Device

Figure 12:
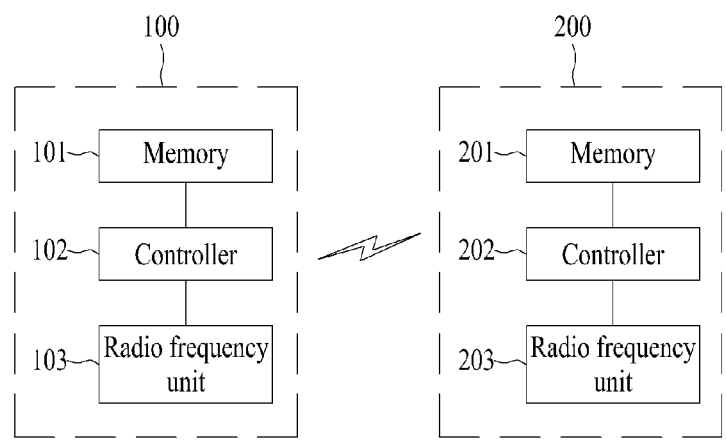
FIG. 12 illustrates a block view showing the structures of a WPAN terminal and a WPAN coordinator according to the exemplary embodiment of the present invention.

FIG. 12 illustrates a block view showing the structures of a WPAN device (or terminal) and a WPAN coordinator according to the exemplary embodiment of the present invention.

The WPAN device (100) may be configured to include a memory (101), a controller (102), and a radio frequency unit (103).

The memory (101) may store the methods proposed in the present specification (or description). Additionally, the memory (101) may store an allocation interval of the transmission band, which is decided by the controller (102). Furthermore, the memory (101) may store transmission band allocation information, which is received from the WPAN coordinator.

The controller (102) controls the overall operations of the WPAN device and also controls the memory (101) and the radio frequency unit (103). Additionally, the controller (102) may decide the allocation interval of the transmission band based upon the Characteristics information included in the device. An example of the transmission band may correspond to a Guaranteed Time Slot (GTS).

The characteristics information may correspond to information that is acquired from the data that are to be transmitted or may correspond to information that is acquired from the characteristics of the device itself. For example, information on the total amount of the data that are to be transmitted, information on whether or not the data correspond to data that are to be periodically transmitted, information on the usage of the device, and so on may correspond to the characteristics information. The controller (102) may decide the allocation interval of the transmission band in super frame units or in predetermined time units.

The controller (102) may control the radio frequency unit (103), so that the transmission band request including the allocation interval (or period) of the decided transmission band can be transmitted to the WPAN coordinator (200) (S210). For example, in case of requesting for the allocation of the GTS, the controller (102) transmits a GTS request command to the WPAN coordinator (200).

The transmission band request may information on a required (or necessary) transmission band and allocation interval decided by the the controller (102). Additionally, the transmission band request may be used a GTS request command defined in the IEEE 802.15.4. At this point, the controller (102) may include the allocation interval (or period) in the GTS Characteristics field within the GTS request command.

The controller (102) may receive an ACK (Acknowledgement) from the WPAN coordinator (200), thereby knowing the confirmation of the transmission band allocation. Additionally, the controller (102) may control the radio frequency unit (103), so that the transmission band allocation information can be received from the WPAN coordinator (200). The transmission band allocation information may correspond to the allocation interval of the transmission band, which is decided by the WPAN coordinator (200), a starting point or ending point of the transmission band, and so on. The controller (102) may receive the allocation information via a beacon or a GTS confirmation command, and the allocation information may be received by being included in the GTS list field within the beacon or by being included in the GTS characteristics field within the GTS confirmation command. At this point, the GTS list field or the GTS characteristics field may further include a Start Sequence Number field and a GTS interval (or period) field, and the Start Sequence Number field indicates a sequence number of a super frame from which the transmission band begins to be allocated to the device, and the GTS interval field indicates an interval of the transmission band, which is allocated to the device.

The controller (102) may control the radio frequency unit (103), so that data can be communicated (or transmitted/received) via the transmission band, which is allocated by the WPAN coordinator.

In case the data communication (or transmission/reception) is completed, the controller (102) may control the radio frequency unit (103), so that the transmission band de-allocation request can be transmitted.

The radio frequency unit (103) may use the transmission band, which is decided based upon the control of the controller (102), so as to be capable of communicating (or transmitting/receiving) data to and from the WPAN coordinator.

The WPAN coordinator (200) may be configured to include a memory (201), a controller (202), and a radio frequency unit (203).

The memory (201) may store the methods proposed in the present specification (or description). Additionally, based upon the control of the controller (202), the memory (201) may store transmission band allocation information respective to a specific device.

The controller (202) controls the overall operations of the WPAN coordinator and also controls the memory (201) and the radio frequency unit (203). Additionally, the controller (202) may control the radio frequency unit (203), so that a transmission band request can be received from the WPAN device. At this point, the transmission band may correspond to a Guaranteed Time Slot (GTS).

The controller (202) may allocate a transmission band based upon a received transmission band request. At this point, the allocation may be performed as requested by the device, or the allocation may be performed differently from what is requested by the device based upon resource situation, communication situation with other devices, and so on. Alternatively, if there is no authorization (or confirmation) to be allocated, a notification indicating that a transmission band cannot be allocated may also be transmitted.

The controller (202) may control the radio frequency unit (203) so that the allocation information can be transmitted to the device. At this point, the allocation information may be transmitted by being included in the GTS list field of the beacon. Alternatively, the allocation information may be transmitted by being included in the GTS Characteristics field of the GTS confirmation command.

At this point, the GTS list field or the GTS characteristics field may further include a Start Sequence Number field and a GTS interval (or period) field, and the Start Sequence Number field indicates a sequence number of a super frame from which the transmission band begins to be allocated to the device, and the GTS interval field indicates an interval of the transmission band, which is allocated to the device.

The radio frequency unit (203) may perform communication with a specific WPAN device via a specific transmission band in accordance with the control of the controller (202). Additionally, the radio frequency unit (203) may transmit the beacon and command frames to a physical channel in accordance with the control of the controller (202).

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The present invention may be realized in another concrete configuration (or formation) without deviating from the spiritual and essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Additionally, claims that do not have any explicit citations within the scope of the claims of the present invention may either be combined to configure another embodiment of the present invention, or new claims may be added during the amendment of the present invention after the filing for the patent application of the present invention.

What is claimed is:

1. A method of receiving a guaranteed time slot (GTS) allocation by a device in a Wireless Personal Area Network (WPAN) system, comprising:
    deciding a GTS allocation period based upon characteristics information of the device;
    transmitting a GTS request to a WPAN coordinator, the GTS request including:
        a GTS allocation period decided by the device; and
        a GTS period field having a length of 2 bits, the GTS period field indicating the GTS allocation period decided by the device; and
    receiving GTS allocation information from the WPAN coordinator, the GTS allocation information including a GTS allocation period decided by the WPAN coordinator based upon the GTS request transmitted by the device.

2. The method of claim 1, wherein the GTS allocation information is received via a beacon frame.

3. The method of claim 2, wherein:
    the beacon frame includes a Start Sequence Number field having a length of 6 bits and a GTS period field having a length of 2 bits;
    the Start Sequence Number field indicates a sequence number of a superframe from which GTS allocation to the device starts; and
    the GTS period field indicates the GTS allocation period decided by the WPAN coordinator.

4. The method of claim 1, wherein the GTS allocation information is received via a GTS confirmation command.

5. The method of claim 4, wherein:
    the GTS confirmation command includes a Start Sequence Number field and a GTS period field;
    the Start Sequence Number field indicates a sequence number of a superframe from which GTS allocation to the device starts; and
    the GTS period field indicates the GTS allocation period decided by the WPAN coordinator.

6. The method of claim 4, wherein, after the receiving of the GTS allocation information, the device operates in a sleep mode up to a superframe including a GTS decided by the WPAN coordinator.

7. A device configured to operate in a Wireless Personal Area Network (WPAN) system, comprising:
    a radio frequency unit configured to transmit and receive signals; and
    a controller connected to the radio frequency unit, the controller being configured to:
        decide a guaranteed time slot (GTS) allocation period based upon characteristics information of the device;
        control the radio frequency unit to transmit a GTS request to a WPAN coordinator, the GTS request including:
            a GTS allocation period decided by the device; and
            a GTS period field having a length of 2 bits, the GTS period field indicating the GTS allocation period decided by the device; and
        control the radio frequency unit to receive GTS allocation information from the WPAN coordinator, the GTS allocation information including a GTS allocation period decided by the WPAN coordinator based upon the GTS request transmitted by the device.

8. The device of claim 7, wherein the GTS allocation information is received via a beacon frame.

9. The device of claim 8, wherein:
    the beacon frame includes a Start Sequence Number field having a length of 6 bits and a GTS period field having a length of 2 bits;
    the Start Sequence Number field indicates a sequence number of a superframe from which GTS allocation to the device starts; and
    the GTS period field indicates the GTS allocation period decided by the WPAN coordinator.

10. The device of claim 7, wherein the GTS allocation information is received via a GTS confirmation command.

11. The device of claim 10, wherein:
    the GTS confirmation command includes a Start Sequence Number field and a GTS period field;
    wherein the Start Sequence Number field indicates a sequence number of a superframe from which GTS allocation to the device starts; and
    wherein the GTS period field indicates the GTS allocation period decided by the WPAN coordinator.

12. The device of claim 10, wherein, after the receiving of the GTS allocation information, the controller is further configured to operate in a sleep mode up to a superframe including a GTS decided by the WPAN coordinator.

* * * * *